United States Patent Office 3,538,391
Patented Nov. 3, 1970

3,538,391
ELECTRICAL LOAD CONTROL SYSTEMS
John T. Bensley, Skaneateles, and Harry E. Wyman, Kenmore, N.Y., assignors to The Singer Company, New York, N.Y., a corporation of New Jersey
Filed June 28, 1968, Ser. No. 741,108
Int. Cl. H01h 47/14
U.S. Cl. 317—139    5 Claims

ABSTRACT OF THE DISCLOSURE

This disclosure relates to a solid-state system for automatically switching on and off dispensable electrical loads on a predetermined priority basis so that the total instantaneous power demand is held close to but does not exceed a predetermined maximum value. The system establishes a regulated reference voltage which has a scaled value representative of the selected maximum demand, a high signal voltage which, to the same scale, is representative of the actual instantaneous demand, a low signal voltage which varies with but has a predetermined value different than the high signal voltage. Two solid-state voltage comparators are used to provide respectively a first output triggering pulse train when the high signal voltage is *above* the reference voltage and a second output pulse train when the low signal voltage is below the reference voltage. The first pulse train triggers a group of silicon controlled rectifiers (SCR's) into conduction in a predetermined sequence. The second pulse train triggers another group of SCR's into conduction in a predetermined sequence. One group of SCR's are used to sequentially *energize* load control relays and the other group of SCR's are used to sequentially *deenergize* the load control relays in reverse sequence. No rotary or stepping switches of any kind are employed in the sequencing control.

BACKGROUND OF THE INVENTION

Prior art systems are known for controlling electrical loads sequentially in response to changes in the total electrical demand and in general, these devices require motor-driven rotary switches, solenoid-actuated stepping switches or relays having special biasing windings and rather complicated circuitry. These prior devices have not been satisfactory because of fault problems connected with contact wear and mechanical inertia of moving parts.

SUMMARY OF THE INVENTION

The present invention provides a load control system which avoids the above-noted disadvantages of the prior art systems by not requiring the use of any electromechanical devices to establish the necessary sequential switching.

In attaining the objects of this invention, all logic is performed by mechanically static solid state devices having no contacts and no inertia difficulties to adversely affect the long-term stable operation of the system.

The system of this invention comprises a sensing unit, a selector unit, a comparator unit and a switching unit. The sensing unit derives a single D.C. voltage signal which is a measure of the total instantaneous A.C. load. The selector unit derives from said single D.C. voltage two signal voltages referred to as the high signal and the low signal. The comparator unit compares the high and low signals with a predetermined fixed reference signal and generates either of two output pulse trains depending on the comparison. If the low signal is *below* the reference voltage a first pulse train is generated. If the high signal is *above* the reference voltage a second pulse train is generated. If the low signal is *above* the reference voltage and the high signal is *below* the reference voltage, no output pulse train is obtained and the system is balanced.

The switching unit comprises a group of silicon controlled rectifiers (SCR's) arranged in similar pairs. Each pair is associated with a load relay for switching on and off a specific load. One SCR of each pair controls the energization of the associated relay. The other SCR of each pair controls the deenergization of the associated relay by a capacitor commutating process to be described.

One pulse train is used to turn on the relay-energizing SCR's in a first predetermined sequence and the other pulse train is used to turn on the relay-deenergizing SCR's in a second predetermined sequence which is the reverse of the first predetermined sequence. Thus the loads can be turned on and off on a predetermined priority basis and all circuit switching except the final load control is accomplished by solid state devices.

DESCRIPTION OF A PREFERRED EMBODIMENT

Figure 1:
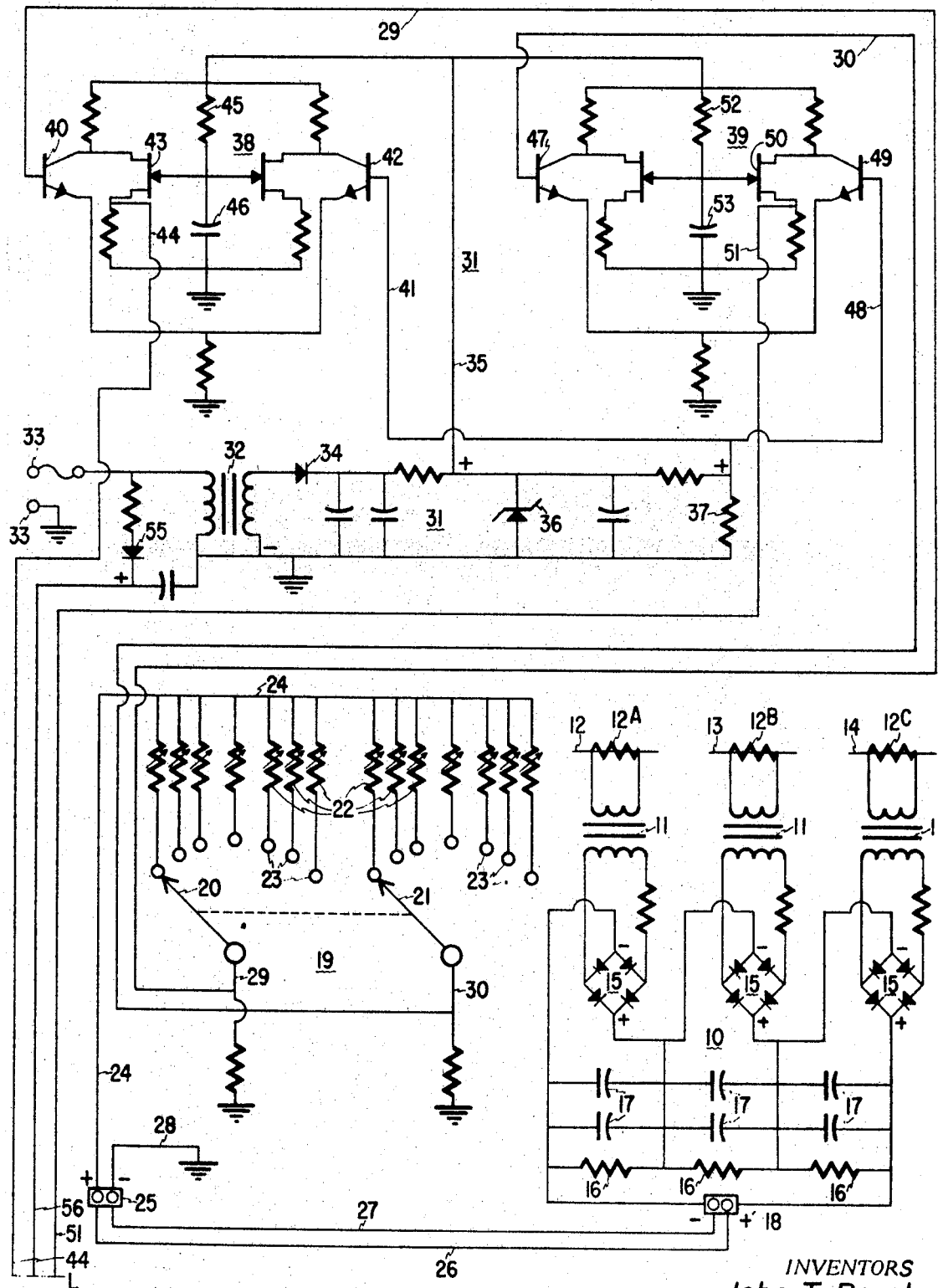

In the drawings, FIG. 1 is a wiring diagram showing the sensing unit, the selector unit and the comparator unit of the system of this invention.

Figure 2:
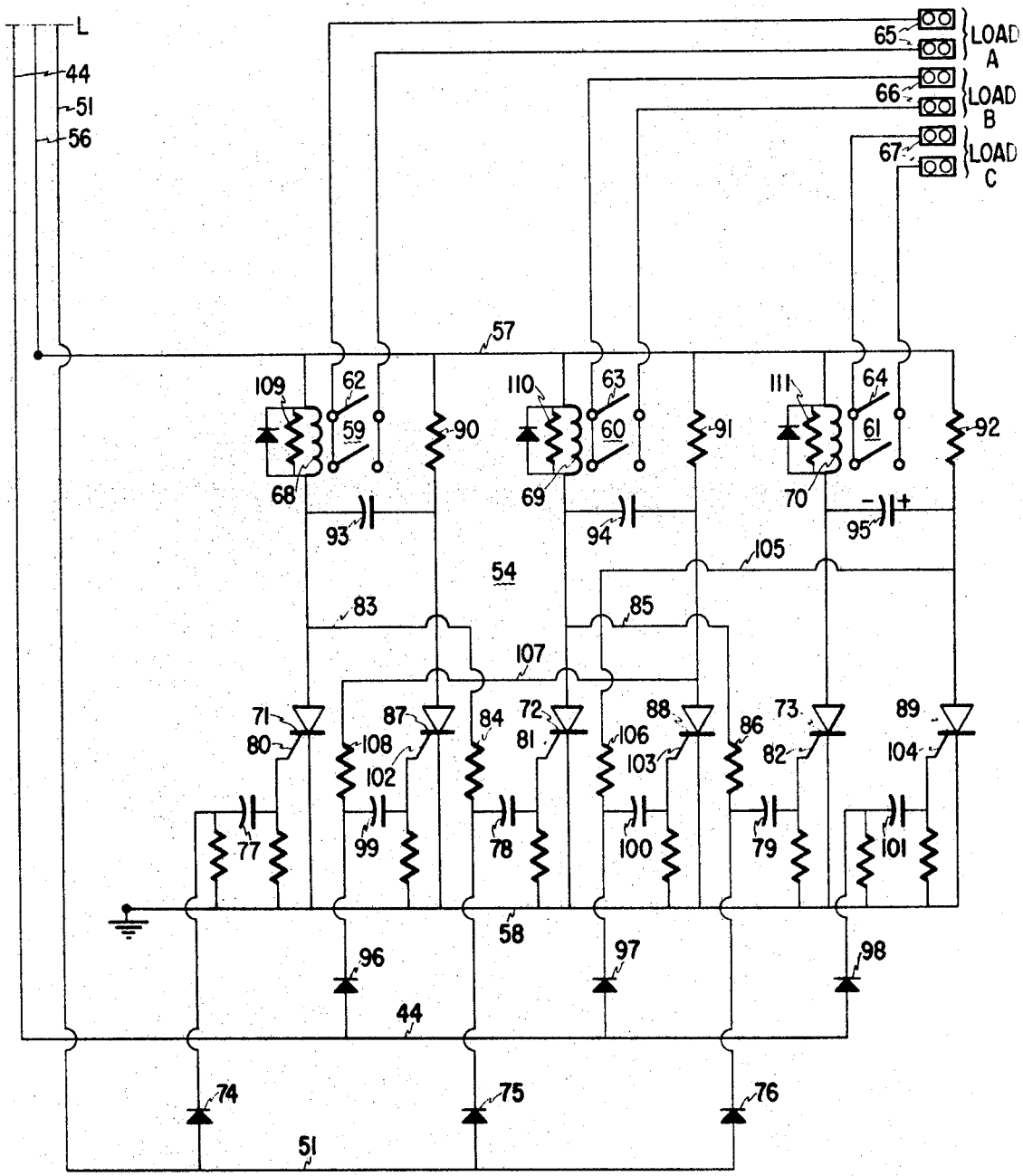

FIG. 2 is a continuation of FIG. 1 and shows the circuitry for the load switching unit.

Referring to the drawings, the sensing unit, indicated generally as 10, comprises current transformers 12A, 12B, 12C connected to bus 12, 13, 14 of a typical three-phase A.C. supply system which supplies the entire load which is to be controlled by the system of this invention. Each current transformer is connected to a transformer 11, which produces a proportional A.C. voltage that is connected through a respective full wave bridge rectifier 15 to a load resistor 16 which is shunted by filter capacitors 17.

The resistors 16 are series connected for summing the voltages across each resistor, the total voltage appearing at output terminal 18 with the polarity shown. Thus the D.C. voltage at terminal 18 is a measure of the sum of the instantaneous A.C. currents flowing to the load in all three phases 12, 13 and 14 and calculations show that this D.C. voltage is closely proportional to the instantaneous power being supplied even with unbalanced phase currents so long as the line voltage is substantially constant, which is the normal condition.

The selector unit, indicated generally as 19, comprises two tap switches 20 and 21 ganged for common operation. Adjustable resistors 22 are connected between respective taps 23 and a common bus 24 connected at terminal 25 to the positive side of the D.C. sensing voltage which is brought to terminal 25 by leads 26 and 27 as shown. The negative side of the D.C. sensing voltage is grounded through lead 28.

The two output signal voltages from the selector unit 19 are carried on leads 29 and 30 to the comparator unit indicated generally as 31. The selector unit 19 is used to select the desired maximum demand for the system and the various switch positions correspond to different kilowatt demand levels which will of course require change as the long-term amount and nature of the connected load changes. The selector unit 19 is basically a two-channel selectable combination of resistors, the values of which have been calculated so as to constitute the top portion of a voltage dividing network in conjunction with the input impedance of the two channels (29 and 30) of the comparator unit 31. At each common kilowatt level position of the switches 20 and 21 a different voltage will appear on the leads 29 and 30 depending on the ohmic value of the resistors 22 which have been selected for that tap position.

As will be explained presently, the comparator unit compares the voltages appearing on leads 29 and 30 with a fixed regulated reference voltage having a value of, for example, 10 volts. The resistor 22 in the first tap position of switch 20 corresponding to 500 kilowatts, for example, is adjusted so that, when the total load demand is 500 kilowatts, the voltage on lead 29 is just 10 volts or equal to the fixed reference voltage. This voltage on lead 29 is conveniently referred to as the Hi Signal and when the load increases above 500 kilowatts the Hi Signal will increase *above* the reference value. Similarly the resistor 22 in the first tap position of switch 21 is adjusted so that, when the total load is at a definite level *below* the 500 kilowatt level, the voltage on lead 30 is just 10 volts or equal to the reference voltage. This voltage on lead 30 is conveniently referred to as the Lo Signal and when the total load decreases from this definite lower level, the Lo Signal will decrease below the 10 volt reference voltage. The decremental amount below the 500 kilowatt level for setting the resistor 22 associated with switch 21 is somewhat arbitrary but should at least be as large as the smallest dispensable load to be switched as will be explained presently.

A conventional power supply indicated generally as 31, comprises a transformer 32 fed from an A.C. supply 33—33 and having a half-wave rectifier 34 which supplies D.C. voltage to lead 35. A Zener diode 36 is used conventionally as a shunt regulator to maintain a constant reference voltage across load resistor 37. This voltage is the reference voltage referred to above as 10 volts.

The comparator unit 31 comprises two exactly similar solid-state comparators indicated generally as 38 and 39 and of the known configuration shown and described on pages 59 and 60 and in FIG. 4.25 of the General Electric SCR Manual, second edition, 1961, to which reference may be had for a more detailed explanation. Comparator 38 has the input signal supplied by lead 29 to the base of transistor 40 and the reference signal is supplied by lead 41 to the base of transistor 42. As is well known from the above reference, if the voltage on lead 29 is *greater than* the reference voltage on lead 41, the unijunction transistor 43 will conduct and by relaxation oscillator action furnish a train of positive trigger pulses on lead 44 at a frequency established substantially by the values of resistor 45 and capacitor 46. If on the other hand, the voltage input on lead 29 is below the value of the reference voltage on lead 41, no pulse will be supplied to lead 44.

Turning now to the other comparator 39, the input signal is supplied by lead 30 to the base of transistor 47 and the reference signal is supplied by lead 48 to the base of transistor 49. As is well known from the above reference, if the voltage on lead 30 is *less than* the reference voltage on lead 48, the unijunction transistor 50 will conduct and furnish a train of positive trigger pulses on lead 51 and at a rate established substantially by the values of resistor 52 and capacitor 53. If, however, the voltage input on lead 30 is above the value of the reference voltage on lead 48, no pulses will be supplied to lead 51.

Translating the above into terms related to the A.C. load, it will be seen that if the A.C. load goes above the predetermined maximum demand value set by the switch 20 of the selector unit 19, a pulse train is initiated on lead 44. If the A.C. load goes below a low value set by the switch 21 of the selector unit 19, a pulse train is initiated on lead 51. If the load is of a value intermediate the above limiting values, no pulse trains are initiated and the system is balanced, that is to say, no corrective action is indicated and no commands are sent to the load switch unit to change its state.

The purpose of the load switching unit, indicated generally as 54 in FIG. 2, is to provide solid-state switching logic which will respond to the pulse train on lead 51 to *energize* load relays in a predetermined sequential order and will respond to the pulse train on lead 44 to deenergize the same load relays but in *inverse* sequential order and without utilizing any mechanically rotating or stepping switch devices.

A positive D.C. voltage obtained from the A.C. supply 30—30 by means of rectifier 55 (FIG. 1) is connected by lead 56 to a common D.C. bus 57. The negative side of the D.C. voltage is connected to ground bus 58.

In FIG. 2 three relays indicated generally as 59, 60 and 61 have normally open contacts 62, 63 and 64, respectively, which are connected to pairs of lug terminals 65, 66 and 67 as shown. Each pair (65, 66, or 67) of terminals is connectible to supply one dispensable load (A, B, or C), such load including in series of course whatever manual or automatic switching devices may be necessary. In the arrangement shown, it will be assumed that the desired order of load priority is A, B and C. That is to say, if power becomes available to supply any dispensable loads, it will be supplied in the order A, B, C. If, on the other hand, it becomes necessary to drop any dispensable load to prevent exceeding a predetermined maximum demand, then the loads will be deenergized in the desired order C, B, A, It will be seen that each relay coil 68, 69 and 70 is in series with the anode-cathode circuit of SCR's 71, 72 and 73 respectively and with the common D.C. busses 57 and 58.

Positive pulses produced on lead 51 from the comparator 39 *may* be conducted through steering diodes 74, 75 and 76, and through capacitors 77, 78 and 79 to the gates 80, 81 and 82 of the respective SCR's 71, 72 and 73 to trigger the SCR's. However, in the condition shown with all relays deenergized, the diode 75 is reverse biased by means of positive potential applied to its cathode by lead 83 and resistor 84 and diode 76 is reverse biased through lead 85 and resistor 86. Thus, the first pulse on lead 51 will be conducted only through diode 74 and capacitor 77 to gate 80 and SCR 71 will be selectively triggered into conduction to energize coil 68 and to thus energize load A connected to terminal pair 65. As soon as SCR 71 is conducting, its anode potential drops to near ground potential and removes the positive bias applied through 83 and 84 to diode 75 so that the next positive pulse on lead 51 will be conducted through diode 75 and capacitor 78 to gate 81 and SCR 72 will be triggered into conduction to energize coil 69 and thus energize load B connected to terminal pair 66. As soon as SCR 72 is conducting, its anode potential drops to near ground potential which removes the reverse bias on diode 76 and permits the next pulse on lead 51 to trigger SCR 73 into conduction to energize coil 70 and close relay contacts 64 to energize load C. The above arrangement of steering diodes to sequentially trigger a group of SCR's is shown and described on page 109 and in Fig. 7.17 of the General Electric SCR Manual, second edition, 1961, and may be referred to for a more detailed explanation thereof.

It will be understood that with the arrangement described each succeeding pulse on lead 51 can trigger into conduction only one SCR of the group 71, 72 and 73 and it will automatically select to trigger the next SCR which is not conducting, in the load priority order of A, B, C. Of course, if all SCR's are already conducting, any subsequent pulse on lead 51 will have no effect.

There remains to be described the means by which positive pulses on lead 44 can be made to drop the loads A, B, C in the reverse sequential order from which they were turned on. For this purpose the anode-cathode circuits of SCR's 87, 88 and 89 are connected in series with respective resistors 90, 91 and 92 across the common D.C. busses 57 and 58. Preferably, the resistors 90, 91 and 92 have the same ohmic value respectively as coils 68, 69 and 70, because, as will be explained, these resistors serve as *substitute* loads in place of the respective coils in the deenergizing process.

Commutating capacitors 93, 94 and 95 are connected across the anodes of the respective SCR pairs (71 and 87), (72 and 88), (73 and 89).

Pulses on lead 44 may be conducted respectively through steering diodes 96, 97 and 98 and capacitors 99, 100 and 101 to gates 102, 103 and 104 of respective SCR's 87, 88 and 89. Assuming that these latter SCR's are *not* conducting but that SCR's 71, 72 and 73 *are* conducting, diode 97 is reverse biased by reason of positive potential applied to its cathode by way of lead 105 and resistor 106. Diode 96 will also be reverse biased through lead 107 and resistor 108. Thus, the first pulse on lead 44 will be conducted *only* through diode 98 and capacitor 101 to gate 104 to trigger SCR 89 into conduction. Assuming that SCR 73 has been conducting the capacitor 95 will be charged substantially to full D.C. potential and of the polarity indicated in FIG. 2. When SCR 89 is triggered into conduction the voltage of capacitor 95 will be applied across the anode-cathode circuit of SCR 73 as reverse bias and it will turn off, thus deenergizing the coil 70 to open contacts 64 and deenergize the load C connected to terminal pair 67. The current which formerly flowed through coil 70 now has been transferred to resistor 92. This arrangement for switching loads between two SCR's by capacitor commutation is shown and described on page 96 and in Fig. 7.6 of the General Electric SCR Manual, second edition, 1961, to which reference may be made.

With SCR 89 conducting, the potential of its anode drops to near ground and removes the reverse bias on diode 97 (through 105 and 106) so that the next positive pulse on lead 44 will be conducted through diode 97 and capacitor 100 to gate 103 and thus will trigger SCR 88 into conduction.

Conduction of SCR 88, by the same process as explained above with respect to SCR 89, will turn off SCR 72 and deenergize coil 69 opening contacts 63 and deenergizing load B connected to terminal pair 66. Further, the current formerly supplied to coil 69 will be transferred to the resistor 91. It will now be clear that the next pulse on lead 44 will trigger SCR 87 into conduction and turn off SCR 71 and deenergize load A. Further pulses on lead 44 will have no effect since SCR's 87, 88 and 89 are all conducting.

It will be understood that while only three dispensable loads (A, B and C) are shown in this embodiment, as many loads as desired may be energized and deenergized on a priority basis in the manner above described, each load requiring a pair of switching SCR's, a commutating capacitor, a pair of steering diodes and a substitute load resistor connected as shown and described above.

It will also be understood that the pulses appearing on leads 44 and 51 may be spaced apart in time by proper choice of the R and C values in the UJT circuits, to afford sufficient time for the load to stabilize at its new value before the next comparison is made. In this manner, the system is rendered desirably insensitive to momentary surges of load voltage or current which would otherwise cause unnecessary switching.

If a relay coil opens up (faults open) this system will "unload" through an open relay position since resistors are substituted for the coil in the unloading sequence. Therefore, the relay is "fail safe" in that it can shed all load. The opening of a relay coil through a fault obviously deenergizes that load and a high load condition can and does sequence through this faulty position. Adding a load in the low load condition will also progress through an open relay coil through the path provided by resistors 109, 110 and 111, connected across the respective relay coils 68, 69 and 70. Thus, a very important inherent feature of this system is the ability to scan through a bad relay and thus to maintain the load switching capability of the system without danger of overload.

In view of the above it will be apparent that there is provided, in accordance with this invention, a system which automatically holds a total electrical load at a value substantially near to but not exceeding a predetermined maximum demand level by switching on and off dispensable loads on a predetermined priority basis and does so by using all solid-state switching logic right up to the load relays.

The generation of first and second pulse trains responsive respectively to increasing and decreasing load value and the predetermined repetition rate of said pulse trains without resort to mechanical switching provides a long-term stability which is unique in systems of this kind.

Having thus set forth the nature of this invention, what is claimed herein is:

1. A system for automatically switching on and off dispensable electrical loads on a predetermined priority basis so that the total instantaneous electrical power demand is held close to but does not exceed a predetermined maximum value comprising:
   (a) means establishing a reference voltage representing to scale a maximum demand value,
   (b) means establishing a first signal voltage representing to scale the actual instantaneous demand value,
   (c) means establishing a second signal voltage related to the first signal voltage by a definite ratio,
   (d) means adjusting said scale and said ratio,
   (e) first solid-state means comparing said first signal voltage with said reference voltage to generate a first pulse train of predetermined frequency,
   (f) second solid-state means comparing said second signal voltage with said reference voltage to generate a second pulse train of predetermined frequency,
   (g) means responsive to said second pulse train to energize said dispensable loads in a predetermined order of priority, and
   (h) means responsive to said first pulse train to de-energize said dispensable loads in a predetermined order of priority which is the inverse of the energizing order of priority.

2. The system according to claim 1 wherein:
   (a) the comparing means is a differential amplifier,
   (b) the pulse train generating means is a pair of unijunction transistors, and
   (c) the output of said differential amplifier determines which one of said unijunction transistors will conduct.

3. The system according to claim 1 wherein:
   (a) the means for energizing the loads includes a first group of silicon controlled rectifiers,
   (b) steering diodes connected to steer said second pulse train to the gates of the controlled rectifiers,
   (c) circuit means selectively controlling the biasing of said diodes responsively to the conducting state of said first group of controlled rectifiers, and
   (d) relay coils connected respectively to said rectifiers for energization thereby.

4. The system according to claim 3 wherein:
   (a) the means for deenergizing the loads includes a second group of silicon controlled rectifiers,
   (b) steering diodes connected to steer the first pulse train to the gates of said second group of rectifiers,
   (c) circuit means for selectively controlling the biasing of said diodes responsively to the conducting state of said controlled rectifiers,
   (d) resistors connected respectively to said second group of rectifiers for energization thereby, and
   (e) capacitor commutating means for transferring the current respectively between the relay coils and said resistors.

5. The system according to claim 4 wherein:
   resistors are connected respectively in shunt with each of said relay coils to permit continued sequential operation in the event of an open relay coil.

(References on following page)

References Cited

UNITED STATES PATENTS

| | | | |
|---|---|---|---|
| 3,469,153 | 9/1969 | Appelo | 317—140 |
| 3,300,648 | 1/1967 | Rockefeller et al. | 307—35 |
| 3,296,452 | 1/1967 | Williams | 307—35 |

J D MILLER, Primary Examiner

W. J. SMITH, Assistant Examiner

U.S. Cl. X.R.

307—41; 317—140; 323—3